United States Patent [19]

Ewen

[11] Patent Number: 6,160,072
[45] Date of Patent: *Dec. 12, 2000

[54] PROCESS FOR POLYMERIZING TACTIOSELECTIVE POLYOLEFINS IN CONDENSED PHASE USING TITANOCENES

[76] Inventor: John A. Ewen, 14311 Golf View Trail, Houston, Tex. 77059

[*] Notice: This patent issued on a continued prosecution application filed under 37 CFR 1.53(d), and is subject to the twenty year patent term provisions of 35 U.S.C. 154(a)(2).

[21] Appl. No.: 08/850,594

[22] Filed: May 2, 1997

[51] Int. Cl.$^7$ .................................. C08F 110/06
[52] U.S. Cl. .................. 526/351; 526/127; 526/128; 526/160
[58] Field of Search .................. 526/127, 128, 526/160, 351

[56] References Cited

U.S. PATENT DOCUMENTS

| | | | |
|---|---|---|---|
| 3,258,455 | 6/1966 | Natta et al. | 526/169.2 |
| 3,305,538 | 2/1967 | Natta et al. | 526/139 |
| 3,314,887 | 4/1967 | Carlson | 252/42.7 |
| 3,364,190 | 1/1968 | Emrick | 526/139 |
| 3,505,369 | 4/1970 | Deffner | 260/429.5 |
| 3,577,448 | 5/1971 | Deffner | 260/429 |
| 3,893,989 | 7/1975 | Leicht et al. | 526/73 |
| 4,200,171 | 4/1980 | Seymour et al. | 181/287 |
| 4,287,328 | 9/1981 | Kikuta et al. | 526/115 |
| 4,316,966 | 2/1982 | Mineshima et al. | 525/53 |
| 4,530,914 | 7/1985 | Ewen et al. | 502/113 |
| 4,794,096 | 12/1988 | Ewen | 502/117 |
| 4,852,851 | 8/1989 | Webster | 251/61.1 |
| 4,874,734 | 10/1989 | Kioka et al. | 502/104 |
| 4,892,851 | 1/1990 | Ewen et al. | 502/104 |
| 4,935,474 | 6/1990 | Ewen et al. | 526/114 |
| 4,975,403 | 12/1990 | Ewen | 502/113 |
| 5,017,714 | 5/1991 | Welborn, Jr. | 556/12 |
| 5,036,034 | 7/1991 | Ewen | 502/117 |
| 5,075,394 | 12/1991 | McDaniel et al. | 526/96 |
| 5,075,426 | 12/1991 | Zielinski | 534/15 |
| 5,120,867 | 6/1992 | Welborn, Jr. | 556/12 |
| 5,122,583 | 6/1992 | Ewen et al. | 526/125 |
| 5,132,262 | 7/1992 | Rieger et al. | 502/117 |
| 5,155,080 | 10/1992 | Elder et al. | 502/152 |
| 5,223,465 | 6/1993 | Ueki et al. | 502/117 |
| 5,225,500 | 7/1993 | Elder et al. | 526/127 |
| 5,225,550 | 7/1993 | Jahne | 544/277 |
| 5,234,878 | 8/1993 | Tsutsui et al. | 502/103 |
| 5,268,495 | 12/1993 | Riepl et al. | 556/11 |
| 5,278,264 | 1/1994 | Spaleck et al. | 526/160 |
| 5,296,434 | 3/1994 | Karl et al. | 502/117 |
| 5,314,973 | 5/1994 | Wilborn | 526/160 |
| 5,391,789 | 2/1995 | Rohrmann | 526/127 |
| 5,416,228 | 5/1995 | Ewen et al. | 556/7 |
| 5,459,117 | 10/1995 | Ewen | 502/117 |
| 5,492,983 | 2/1996 | Olonde et al. | 526/64 |
| 5,495,036 | 2/1996 | Wilson et al. | 556/12 |
| 5,527,752 | 6/1996 | Reichle et al. | 502/117 |
| 5,539,124 | 7/1996 | Etherton et al. | 548/402 |
| 5,672,668 | 9/1997 | Winter et al. | 526/160 |
| 5,688,735 | 11/1997 | Ewen et al. | 526/160 |
| 5,723,643 | 3/1998 | Fukuoka et al. | 526/127 |
| 5,770,753 | 6/1998 | Kuber et al. | 526/127 |

FOREIGN PATENT DOCUMENTS

| | | |
|---|---|---|
| 2055218 | 5/1992 | Canada . |
| 0277003 | 8/1988 | European Pat. Off. . |
| 0277004 | 8/1988 | European Pat. Off. . |
| 0426638 | 5/1991 | European Pat. Off. . |
| 0427697 | 5/1991 | European Pat. Off. . |
| 0537130 | 4/1993 | European Pat. Off. . |
| 2488259 | 2/1982 | France . |
| 43 37 230 A1 | 10/1993 | Germany . |
| 57-54126 | 3/1982 | Japan . |
| 63-270313 | 11/1988 | Japan . |
| 6-73067 | 3/1994 | Japan . |
| 08 081 516 | 3/1996 | Japan . |
| 801482 | 10/1981 | U.S.S.R. . |
| 2274456 | 7/1994 | United Kingdom . |
| WO 95/33776 | 12/1995 | WIPO . |
| WO 9608498A1 | 3/1996 | WIPO . |

OTHER PUBLICATIONS

Yamamoto, H., et al, "Structural Features in Electron–Deficient (n–Pentamethylcyclo–pentadienyl) titanium–diene Complexes and Their Catalysis in the Selective Oligomerization of Conjugated Dienes", *Organometallics*, Jan. 1989, 8, pp. 105–119.

Yang, X., et al, "Cation–like Homogeneous Olefin Polymerization Catalysts Based upon Zirconocene Alkyls and Tris(pentafluorophynyl) borane", *J. Am. Chem. Soc.*, 1991, 113, p. 3623.

Zembelli, A., et al, "Isotactic Polymerization of Propene: Homogeneous catalysts Based on Group 4 Mettalocenes Without Methylaluminoxane," *Macromolecules*, 1989, 22, pp. 2186–2189.

Ewen, J.A., et al, "Metallocene/Polypropylene Structural Relationships: Implications on Polymerization and Stereochemical Control Mechanisms", *Makromol. Chem. Macromol. Symp.*48/49, (1991) pp. 253–295.

Ewen, J.A., et al, "Syndiospecific Propylene Polymerizations with iPr[CpFlu] ZrCl$_2$", Oct. 23–25, 1989, pp. 439–443.

Ewen, J.A., et al, "Propylene Polymerizations with Group 4 Metallocene/Alumoxane Systems," *W. Kaminsky and H. Sinn (Eds) Transition Metals and Organometallics as Catalysts for Olefin Polymerization*, 1988 pp. 281–289.

(List continued on next page.)

Primary Examiner—David W. Wu
Assistant Examiner—Caixia Lu
Attorney, Agent, or Firm—Robert W Strozier

[57] ABSTRACT

A process for polymerizing addition polymerizable monomers using titanocenes catalysts/catalyst precursors having a selected symmetry condition under condensed polymerization conditions where the symmetry condition is such that the resulting polymer has varying degrees of tactioselectivity or copolymers having regions of varying degrees of tactioselectivity. Preferred classes of the titanocenes are capable of generating near pure isospecific and syndiospecific polymers in solution or in bulk polymerization conditions.

20 Claims, No Drawings

OTHER PUBLICATIONS

Ewen, J.A., et al, "Syntheses and Models for Stereospecific Mettalocenes," *Makromol. Chem., Macromol. Symp.* 66, (1993) pp. 179–190.

Farina, M., et al, "Hemitactic Polypropylene: An Example of a Level Kind of Polymer Tacticity", *Macromelcules*, 1982, 15, p. 1451.

Fendrick, C.M., et al, "Manipulation of Organoactinide Coordinative Unsaturation. Synthesis, Structures, and Reactivity of Thorium Hydrocarbyls and Hydrides with Chelating Bis (tetramethylcyclopentadienyl) Ancillary Ligands" *Organometallics*, 1988, 7, pp. 1828–1838.

Jordan, R.F., et al, "Reactive Cationic Dicyclopentadienylzirconium (IV) Complexes", *J. Amer. Chem. Soc.*, 1986, 108, p. 1718.

Liu, J, et al, "Bis(2,4–dimethylpentadienyl) titanium: An Open Titanocene", *J.Am.Chem. Soc.* 1982, 104, pp. 3737–3739.

Mallin, D.T., et al *J. Am. Chem. Soc.*, 1990, 112, p. 2030.

Roll, W., et al, "Stereo and Regioselectivity of Chiral, Alkyl–substituted ansa–Zirconocene Catalysts Methylalumoxane–activated Propene Polymerization", Angew. Chem. Int. Ed. Engl., 1990, 29, p. 279.

Spalek, Walter, et al "High Molecular Weight Polypropylene through Specifically Designed Zirconocene Catalysts" *Angew. Chem. Int. Ed. Engl.*, May 16, 1992, 31, No. 10 p. 1347.

Agarwal, S.K. et al, "Schiff Base Derivatives of Lanthanon–A Novel Synthesis . . . " Apr. 1975, *JNuc.Chem.* vol. 37, No. 4, pp. 949–954.

Besancon, J., "Problemes de Stereochimie Dynamique en Serie Du Titanocene" *Journal of Organometallic Chemistry*, 1977, 127, pp. 139–151.

Cavallo, I., et al, "A Possible Model for the Stereospecificity in the Syndiospecific Polymerization of Propene with Group 4A Metallocenes", *Macromolecules*, 1991, 24, p. 1784.

Couglin, E.B., et al, "Iso–Specific Ziegler–Natta Polymerization of a–Olefins with a Single–Component Organoyttrium Catalyst", *J. Amer. Chem. Soc.*, 1992, 114, p. 7606.

Ewen, J.A., et al, "Syndiospecific Propylene Polymerizations with Group 4 Metallocenes" *J. Amer. Chem. Soc.*, 1988, 110, p. 6255.

Ewen, J.A., et al, "Mechanisms of Stereochemical Control in Propylene Polymerizations with Soluble Group 4B Metallocene/Methylalumoxane Catalysts", *J. Amer. Chem. Soc.*, 1984, 106, p. 6355.

Ewen, J.A. "Ligand Effects on Metallocene Catalyzed Ziegler–Natta Polymerizations", pp. 271–292.

PROCESS FOR POLYMERIZING TACTIOSELECTIVE POLYOLEFINS IN CONDENSED PHASE USING TITANOCENES

BACKGROUND OF THE INVENTION

1. Field of the Invention

This invention relates to a method for making tactioselective polyolefin homopolymers and copolymers using titanocenes with selected symmetry conditions.

More particularly, this invention relates to a method for making tactioselective polyolefin homopolymers and copolymers using titanocenes with selected symmetry conditions in condensed phases at temperature above about 50° C.

2. Brief Description of Related Art

Polymerization of vinyl monomer, both mono-olefins and conjugated dienes, has focused on transition metal catalysts since the work of Ziegler and Natta. These catalysts are based on a central transition metal ion or atom surrounded by a set of coordinating ligands and modified by various co-catalysts. These polymerization systems when brought in contact with addition polymerizable monomers polymerize the monomers into polymers.

By controlling the nature of the ligand system, the central transition metal ion or atom, and the co-catalyst, highly active catalytic agents can be made. In addition, catalysts can be made that yield polymers with high degrees of addition regularity and in the case of non-ethylene type monomers, stereoregular or tactioselective and/or tactiospecific polymers can be made.

Atactic polymers exhibit no regular order of repeat unit orientation in the polymer chain, i.e., the substituents are not regularly ordered relative to a hypothetical plane containing the polymer backbone (the plane is oriented such that the substituents on the pseudo-asymmetric carbon atoms are either above or below the plane). Instead, atactic polymers exhibit a random distribution of substituent orientations.

Besides metallocene catalyst that produce polyethylene and atactic polyolefins, certain metallocenes are also known to produce polymers with varying degrees of stereoregularity or tactiospecificity, such as isotactic, syndiotactic, and hemi-isotactic polymers which have unique and regularly repeating stereochemistries or substituent orientations relative to the plane containing the polymer backbone.

Isotactic polymers are typically described as having the substituents attached to the—asymmetric carbon atoms, oriented on the same side relative to the polymer backbone, i.e., the substituents are all either configured above or below the plane containing the polymer backbone. Isotacticity can be determined through the use of NMR. In Bovey's NMR nomenclature, an isotactic pentad is represented by . . . mmmm . . . with each "m" representing a "meso" dyad or successive monomer units oriented with the substituents oriented on the same side relative to the polymer backbone. As is well known in the art, any deviation, disruption, or inversion about a pseudo-asymmetric carbon in the chain will lower the degree of isotacticity and crystallinity of the polymer.

In contrast, the syndiotactic structure is typically described as having the substituents, that are attached to the pseudo-asymmetric carbon atoms, pseudo-enantiomorphically disposed, i.e., the substituents are oriented alternately and regularly above and below the plane containing the polymer chain. Syndiotacticity can also be determined through the use of NM. In NMR nomenclature, a syndiotactic pentad is represented by . . . rrrr . . . in which each "r" represents a "racemic" dyad, i.e., successive substituents on alternate sides of the plane. The percentage of "r" dyads in the chain determines the degree of syndiotacticity of the polymer.

There are other variations in polymer structures as well. One such variant is the so-called hemi-isotactic polymers. Hemi-isotactic polymers are ones in which every other pseudo-asymmetric carbon atom has its substituent oriented on the same side relative to the plane containing the polymer backbone. While, the other pseudo-asymmetric carbon atoms can have their substituents oriented randomly either above or below the plane. Since only every other pseudo-asymmetric carbon is in an isotactic configuration, the term hemi is applied.

Isotactic and syndiotactic polymers are crystalline polymers and are insoluble in cold xylene. Crystallinity distinguishes both syndiotactic and isotactic polymers from hemi-isotactic or atactic polymers that are soluble in cold xylene and are non-crystalline. While it is possible for a catalyst to produce all four types of polymers (atactic, hemi-isotactic, isotactic and syndiotactic), it is desirable for a catalyst to produce predominantly or essentially exclusively isotactic or syndiotactic polymer with very little atactic polymer and few stereochemical defects.

In recent years, numerous patents and applications have been filed relating to the use of metallocene and constrained geometry catalyst for the efficient production of polyolefins and for the efficient formation of tactioselective polyolefins including iso, hemiso and syndio tactic polypropylene.

Constrained geometry catalysts where one the cyclopentadienyl groups has been replaced by a hetero atom ligand such as an amino or phosphino anion are described in the following U.S. Pat. Nos.: 5,453,410, 5,399,635, and 5,350,723, incorporated herein by reference.

Several catalysts that produce isotactic polyolefins are disclosed in U.S. Pat. Nos. 4,794,096 and 4,975,403, as well as European Pat. Appl. 0,537,130, incorporated herein by reference. Several catalysts that produce syndiotactic polyolefins are disclosed in U.S. Pat. Nos. 3,258,455, 3,305,538, 3,364,190, 4,852,851, 5,155,080, 5,225,500, and 5,459,117, incorporated herein by reference.

Besides neutral metallocenes, cationic metallocenes are known to result in polymers with varying degrees of tactiospecificity. Cationic metallocene catalysts are disclosed in European Patent Applications 277,003 and 277,004, incorporated herein by reference. Catalysts that produce hemi-isotactic polyolefins are disclosed in U.S. Pat. Nos. 5,036,034, incorporated herein by reference.

In addition to polymers of mono-olefins homopolymers, polymerization catalysts for preparing copolymers of mono-olefins or polymers of di-functional olefins or copolymers of di-functional olefins and mono-olefins can be prepared using coordinated metal catalysts including metallocene catalysts.

Although these catalysts are efficient for the production of polyolefins, most of these catalysts are designed to operate a fairly modest temperature (about 70° C.) in the gas phase and are not suitable for high temperature solutions polymerization where the temperature can exceed about 120° C. In such condensed phase polymerization, a process using a set of titanocene catalysts that can produce tactioselective to tactiospecific catalyst in condensed phase polymerizations would represent an advancement in the art.

SUMMARY OF THE INVENTION

The present invention provides a condensed phase polymerization process for making polyolefins and particularly, tactioselective or tactiospecific homopolymers and copolymers that include tactioselective or tactiospecific regions within the copolymer microstructure using titanocenes having a selected symmetry condition. The process comprises contacting at least one addition polymerizable monomer with at least one titanocene of formula (I):

where:
(a) Z and Z' are the same or different and are a five centered, six π electron ligand;
(b) R" is structural bridge;
(c) Q is a linear or branched alkyl radical, an aryl radical, an alkenyl radical, an alkylaryl radical, an arylalkyl radical or a halogen atom;
(d) A is a counterion;
(e) k is an integer having a value from 1 to 3;
(f) l is an integer having a value from 0 to 2; and
(g) ZR"Z' has a given symmetry condition so that the titanocenes generate polymers or polymer regions having a desired degree of tactioselectivity.

Preferably, the catalyst and monomer are contacted together in a reaction zone. Alternatively, the catalysts of formula (I) can be combined with a co-catalyst such as an alkyl aluminum or, an alumoxane either prior to or after the titanocene of formula (I) is brought into contact with monomer. The titanocenes of the present invention are particularly useful for condensed phase polymerization of addition polymerizable monomers such as α-olefins into homopolymer and/or copolymers. However, these catalysts would also find utility in gas phase polymerization reactions and can be supported on supports to produce heterogeneous analogs.

The titanocenes suitable for use in the method of the present invention comprise organotitanium coordination compounds of di and tri-functional ligand systems, where the ligand system is bridged and has a selected symmetry or near-symmetry condition. The bridging group R" includes single atom bridges where the R" group is bonded to one atom of Z and Z' and bridges that connect two sites of Z and Z' (especially adjacent sites) which forms a ring bridge, e.g., a ligand system having two dimethysilyl moieties, one bonding the 1,1' and the other bonding 2,2' sites of two cyclopentadienyl rings.

Formula (I) also describes cationic catalysts where l=1 or 2. These cationic catalysts are prepared by reacting an ion-pair or a strong Lewis acid compound with a neutral titanocene (i.e., l=0) to form a cationic titanocene either prior to or concurrent with contacting the catalytic system with monomer. The cationic catalysts are used analogously to the neutral catalysts to polymerize addition polymerizable monomers.

Furthermore, the titanocenes of formula (I) may be made into pre-polymerized catalytic systems prior to contacting the system with bulk monomer and/or prior to the stabilization of the reaction conditions.

The present invention can also be practiced to produce intimate blends of different types of polymers by contacting a titanocene of formula (I) designed for each different polymer type with one or more monomers and to use a titanocene of formula (I) with another polymerization catalyst.

The preferred applications of practicing this invention is in the production of polyethylene, polyethylene copolymers, polypropylene, polypropylene copolymers, isotactic polypropylene, syndiotactic polypropylene, hemi-isotactic polypropylene, or mixtures thereof as well as polymers and copolymers of other addition polymerizable monomers.

DEFINITIONS

"Cp" means a ligand containing an all carbon cyclopentadienyl ring;

"Op" means an all carbon, open, five centered, six π electron ligand such as 1,4-pentadiene;

"HCp" means a cyclopentadienyl containing ligand containing at least one non-carbon atom in the ring system;

"COp" means an all carbon, non-cyclopentadienyl, cyclic five centered, six π electron ligand such as 1,4-cyclohexadiene or 1,4-cyclohepatadiene;

"HOp" means an open, five centered, six π electron ligand containing at least one non-carbon atom in the ligand such as 4-methylpenta-4-ene-2-thione;

"CHOp" means a non-cyclopentadienyl, cyclic five centered, six π electron ligand containing at least one non-carbon atom in the ligand such as 2,5-dihydropyridine;

The prefix "h-" connotes the heterocyclic analogs of an all carbon aromatic ring systems, e.g., h-Flu means a fluorene or fluorane ring system containing at least one non-carbon atom or h-Ptene means a pentalene or pentalane ring system containing a least one hetero atom;

The prefix "o-" connotes the open-pentadienyl analog of an all carbon aromatic ring systems, e.g., o-Flu represents 1,1-diphenyl methane;

"Tactioselectivity" means a polymer with some amount of tacticity such as isotacticity, syndiotacticity or hemi-isotacticity;

"Tactiospecificity" means a polymers with a high degree of tacticity generally above about 80% tactioselectivity;

"Bilateral symmetry" means that one of the ligands of a bridged ligand system has a bisecting minor plane, e.g., isopropenyl(3-t-butyl cyclopentadiene)(3,4-dimethylcyclopentadiene) has one ligand with bilateral symmetry, the 3,4-dimethylcyclopentadiene, and one ligand that does not have bilateral symmetry, the 3-t-butylcyclopentadiene);

"Pseudo or Near Bilateral symmetry" means that one of the ligands of a bridged ligand system has near bilateral symmetry, e.g., isopropenyl(3-t-butyl cyclopentadiene)(3-chloro-4-methylcyclopentadiene) has one ligand with pseudo or near bilateral symmetry, the (3-chloro-4-methylcyclopentadiene) ligand. Thus, near or pseudo bilateral symmetry means that substituents in symmetry equivalent sites on the ligand with respect to a bisecting mirror plane are not identical but similar;

"$C_2$ symmetry" has its traditional meaning, i.e., the ligand has a $C_2$ axis of symmetry, e.g., rac-isopropenylbis (3-t-butylcylcopentadiene);

"Near or Pseudo $C_2$ symmetry" means that the group in symmetry equivalent positions are not identical but similar, e.g., rac-isopropenyl(3-t-butylcylcopentadiene)(3-isopropylcyclopentadiene);

"$C_S$ symmetry has its traditional meaning, i.e., the ligand is symmetric with respect to a bisecting mirror plane axis of symmetry, e.g., isopropenyl(cyclopentadiene)(3,4-dimethylcyclopentadiene); and "Near or Pseudo $C_S$ symmetry" means that the group in symmetry equivalent positions are not identical but similar, e.g.,isopropenyl(cyclopentadiene)(3-chloro-4-methylcyclopentadiene).

DETAILED DESCRIPTION OF THE INVENTION

The inventor has found that titanocenes meeting certain symmetry conditions can make tactioselective polyolefins or copolymers having regions of tactioselectivity under condensed phase polymerization conditions, especially in solution polymerization or bulk polymerization, at elevated temperature generally above about 50° C. The method broadly speaking involves contacting a titanocene catalyst having a specific symmetry condition with an addition polymerizable monomer in a condensed (non-gaseous) phase at a temperature and pressure sufficient to maintain the reaction condition in a condensed phase to produce homopolymers having varying degrees of tactioselectivity or copolymers having regions having varying degrees of tactioselectivity.

The titanocenes suitable for use in the method of the present invention are titanocenes capable of polymerizing addition polymerizable monomers under condensed phase catalytic conditions are represented by formula (I):

   (I)

where:

(a) Z and Z' are the same of different and are a five centered, six π electron ligand;

(b) R" is structural bridge;

(c) Q is a linear or branched alkyl radical, an aryl radical, an alkenyl radical, an alkylaryl radical, an arylalkyl radical or a halogen atom;

(d) A is a counterion;

(e) k is an integer having a value from 1 to 3;

(f) l is an integer having a value from 0 to 2; and (g) ZR"Z' group has a given symmetry condition so that the titanocenes generate polymers or polymer regions having a desired degree of tactioselectivity.

In particular, the present invention is directed towards processes for the condensed phase polymerization of addition polymerizable vinyl monomers, including α-olefins such as propylene, butylene, or the like. The organotitanium catalyst systems are designed by having a selected symmetry condition to produce tactioselective polymers such as polymers having varying degrees of isotacticity, syndiotacticity, hemi-isotacticity polymers or copolymers with symmetric monomers such as ethylene polymers where the copolymers have regions with varying degrees of tacticity. The selected symmetry conditions are specific for each type of tactioselective polymers desired. For isotacticity, the titanocene should have $C_2$ or near or pseudo $C_2$ symmetry, while for syndiotacticity, the titanocene should have $C_S$ or near or pseudo $C_S$ symmetry.

Preferred ligand systems for the titanocenes of formula (I) for generating polymers having varying degrees of isoselectivity are titanocenes having $C_2$ or pseudo $C_2$ symmetry and where R" is a single bridge (bridges only one atom of Z and Z') and Z and Z' bear identical substituents or similar substituents and are the same or different cyclopentadienyl containing ligands, hetero atom analogs of cyclopentadienyl containing ligands, non-cyclopentyl, cyclic 5 centered, 6 electron systems, or opened, 5 centered, 6 electron systems. Particularly preferred ligand systems are those with two bulky β substituents one on Z and one on the symmetrical equivalent site of Z' and two less bulky α substituents one on Z and one on a symmetrical equivalent site of Z'. Especially preferred Z and Z' ligands are represented by the following formula (a–c):

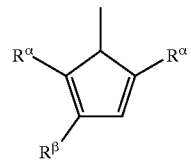

(a)

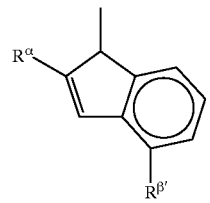

(b)

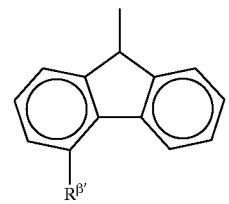

(c)

where $R^\alpha$ is the same or different and is any group that will bond to the ring atom (which may be other than carbon) including hydrogen carbon containing groups, nitrogen containing groups, oxygen containing groups, boron containing groups, phosphorus containing groups, sulfur containing groups or all other group capable of forming a stable bond with the ring atom; and where $R^\beta$ and $R^{\beta'}$ are the same or different and are any non-hydrogen group and preferably groups having a steric bulk greater than a hydrogen atom and particularly greater than or equal to the steric bulk of a methyl group or aromatic carbon (which would be part of a fused ring system such as indene and fluorene).

Preferred ligand systems for use in making titanocene capable of generating syndioselective polymers are double bridged ligand systems of formula (d) having $C_S$ or pseudo $C_S$ symmetry:

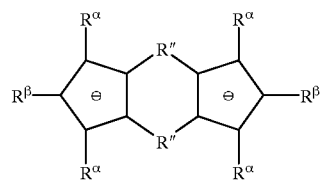

where R" are the same or different and are as described above and $R^\alpha$, $R^\beta$ and $R^{\beta'}$ are as described above.

More than one titanocene catalysts of the present invention or the titanocenes of the present invention can be mixed with other polymerization catalysts to produce intimate mixtures of polymers. The polymers produced by the titanocenes of the present invention are intended for fabrication into articles by extrusion, inection molding, thermoforming, rotational molding, or the like. Additionally, under certain conditions, preferred catalysts of the present invention can produce polymers with very high tactioselectivity approaching tactiospecificities of about 80 to about 100% and preferably about 90 to about 100%, i.e., the polymers have near perfect tacticity such as nearly perfect isotactic polypropylene as measured by the melting point of the polymers which is about 165° C.

The polymers which can be prepared using the titanocenes of this invention include homopolymers and copolymers of vinyl monomers having from about 2 to about 20 carbon atoms and preferably from about 2 to about 12 carbon atoms with homopolymers and co-polymers of ethylene, propylene, butylene, and styrene being particularly preferred. Preferred polymers and copolymers of the present invention include polymers derived from monomers capable of yielding tactic polymers (monomers that do not have symmetry) having varying degrees of tactioselectivity or having regions of tactioselectivity. In addition, the vinyl monomers can also include various hetero atoms such monomers would include acrylonitrile, vinyl pyridine, or the like.

In a preferred embodiment of the present invention, the titanocenes of formula(I) are such that the ZR"Z' ligand system has $C_2$ or near (or pseudo) $C_2$ symmetry and generate polymers of non-symmetric α-olefins with varying degrees of isotacticity approaching, under appropriated conditions, near isospecific polymers having a melting point within 5% of the value for a pure isotactic polymer, e.g., isotactic polypropylene with a melting point above about 160° C. and particularly with a melting point above about 162° C. and especially with a melting point above about 164° C. It should be recognized that the melting point of most polymers having varying degrees of tactioselectivity will vary somewhat depending on the exact method for performing the measurement. However, irrespective of the method used, the titanocenes of the present invention can produce polymers with near perfect tacticity having melting points substantially the same as a pure sample of the given tactic polymer.

In another preferred embodiment of the present invention, the titanocenes of formula(I) are such that the ZR"Z' ligand system has $C_S$ or near (or pseudo) C, symmetry and generate polymers of non-symmetric α-olefins with varying degrees of syndiotacticity approaching, under appropriated conditions, near syndiospecific polymer with melting point within about 5% of the value for a pure syndiotactic polymer for the given monomer used.

Generally, tactioselective catalyst/catalyst precursors, and even tactiospecific catalysts, of the present invention are formed when the ligands Z and Z' of the ligand system ZR"Z' of formula (I) bear the same or different substituents in some or all of the positions α and β to the atoms bonded to the bridging group R" such that at least one β substituent is a bulky substituent. For the purposes of this invention the term bulky substituent will mean a non-hydrogen substituent. Therefore, any atom or group that can replace a hydrogen atom at a β site on the Z or Z' will be considered sterically bulkier than hydrogen. Preferably, the β substituent is bulkier than a methyl group or an aromatic carbon atom (which are of essentially the same relative steric bulk), e.g., ethyl, isopropyl, t-butyl, methoxy, methylamino, etc. Preferably, such ligand systems possess a specific overall symmetry condition. Additional information on the effect of bulky β substituent can be found in U.S. Pat. No. 5,459,117, incorporated herein by reference.

Titanocenes of formula (I) capable of yielding polymers with varying degrees of selectivity to the isotactic joining of monomer units ("isoselective titanocenes"), including nearly isospecific polymers ("isospecific titanocenes"), are titanocenes where the overall ligand system has either $C_2$ or near or pseudo $C_2$ symmetry. Isoselective catalysts include titanocenes where neither Z or Z' is bilaterally or pseudo-bilaterally symmetric and both Z and Z' ligands have a single bulky β substituent irrespective of the number and type of α-substituents. Alternatively, isoselective titanocenes include ligand systems where either the Z or Z' ligand is bilaterally or pseudo-bilaterally symmetric and where the non-bilaterally symmetric ligand has only one bulky β substituent. In the case of Op or HOp containing ligand systems, the substituents will be on positions structurally equivalent to the α and β sites of cyclopentadiene and for the purpose of this invention, the numbering system for Op or HOp containing ligand systems will be such that the atom(s) to which the bridging group R" is or are attached will represent the atom(s) from which the a and β sites will relate.

Titanocenes of formula (I) capable of yielding polymers with varying degrees of selectivity to the syndiotactic joining of monomer units ("syndioselective"), including syndiospecific polymers ("syndiospecific titanocenes"), are titanocenes where the overall ligand system has either $C_S$ or pseudo-$C_S$ symmetry. Syndioselective catalysts include titanocene where both Z and Z are bilaterally or pseudo-bilaterally symmetric and where either Z or Z, but not both, have bulky β substituents irrespective of the number and type of α-substituents.

In its broadest form the process of the present invention involves polymerizing an addition polymerizable monomer such as an α-olefin, either alone or together with other addition polymerizable monomers in the presence of a catalyst system including at least one component of formula (I) and optionally a co-catalyst such as an alumoxane. Alternatively, the process includes simply contacting at least one polymerizable monomer with a catalyst system including at least one titanocene of formula (I) under condensed phase polymerization conditions, i.e., conditions of temperature and pressure necessary to maintain the polymerizing system in a condensed phase. Maintaining the polymerization in a condensed phase does not mean and is not meant to indicate that solvent or monomer does not boil during the polymerization; this term is only means that the polymerization reaction is not occurring in the gas phase.

The present invention further provides a process for producing copolymers having tactioselective regions and even tactiospecific regions within the polymers comprising contacting at least one non-symmetric addition polymerizable monomer and at least one symmetric addition polymerizable monomer with a catalyst system including at least one titanocene of the formulas (I) where the ligand system of the titanocene catalysts/catalyst precursors that bear tacticity controlling α and β substituents as described herein. Symmetric addition polymerizable monomers include, without limitation, ethylene, 1,1-difluoroethylene or the like. Non-symmetric addition polymerizable monomers include, without limitation, all α-olefins such as propene, 1 - butene, 1 -hexene or the like.

Many titanocene catalysts/catalyst precursors of formulas (I) that are capable of producing tactioselective and/or tactiospecific polymers when contacted with monomers capable of forming polymers with tacticity, have certain specific substitution requirements that often impart actual or pseudo symmetry to the ligand system and/or the titanocene catalyst/catalyst precursor. The symmetry terms generally used to describe titanocene catalyst systems that generate tactioselective polymers are described below.

The term bilateral symmetry means that the ligands of the ligand system ZR"Z' are symmetric with respect to a bisecting mirror plane perpendicular to the plane containing the ligand and bisecting the ligand into two parts. For bridged ligand systems where the bridge bonds to only one atom of Z and Z' of the ZR"Z' ligand systems, bilateral symmetry will mean that the substituents with the 2 and 5 positions (the α sites) and the 3 and 4 positions (the β sites) which are in a mirror image relationship, respectively, will be identical, e.g., 3,4-dimethyl Cp or 2,5-dimethyl Cp. The term pseudo-bilateral symmetry means that the 3,4 and 2,5 substituents are of similar but not identical, e.g., methyl and ethyl, phenyl and pryidyl, naphthyl and quinoline, methyl and chloro, hydrogen and fluoro, etc. For bridged ligand systems where the bridge bonds two atoms on the Z and Z' ligand, bilateral symmetry and pseudo bilateral symmetry are analogous except that for adjacent bridging schemes, there is only one β site so that the a substituents must be identical or similar.

To produce isoselective catalysts having either $C_2$ symmetry or pseudo-$C_2$ symmetry, the ligand systems are contacted with an appropriate metallic species which yields a mixture of meso isomers which yield atactic polymer and rac isomers which yield isoselective polymers. The meso and rac isomers can be separated by crystallization or other separation techniques well known in the art.

Moreover, isoselective catalyst can also be prepared that do not have inactive meso forms. Such isoselective catalysts generally comprise on bilaterally symmetric radical and one asymmetric radical (not bilaterally or pseudo-bilaterally symmetric).

In accordance with this invention, one can also produce olefin copolymers particularly copolymers of ethylene and/or propylene and other olefins by a judicious choice of titanocenes of the general formula (I). The choice of titanocenes of the present invention can be used to control comonomer content as well as other properties of the polymer such as tacticity for vinyl monomers other than ethylene or ethylene like monomers.

The titanocene catalyst/catalyst precursors of the present invention include ligand systems bearing substituent other than hydrogen on any of the sites of the ligand system. The substituents can be of any chemically meaningful type, including, without limitation, boron containing (bonding through the boron atom), carbon containing (bonding through the carbon atom), nitrogen containing (bonding through the nitrogen atom), and analogous substituents for all other atomic species of the periodic table that a capable of forming bonded substituents. The substituents can also be fused rings attached to the central radical can be aromatic, non-aromatic, unsaturated and/or unsaturated ring or ring systems. Additionally, the central radical can include the phosphino-boratabenzene radicals (that are prepared according to the procedure described in Quan, R. W. et al, *J. Am. Chem. Soc.*, 1994, 116, 4489)

Examples of substituents that can be attached (bonded) to the ligand Z and Z' include, without limitation, any B, C, N, O, Al, Si, P, S, Ga, Ge, As, Se, In, Sn, Sb, Te, transition metals, actinide or lanthenide or any other substituent as well as substituent containing any number of different atomic species. Exemplary examples of some heterocyclic ring substituents include, without limitation, pyrrole, isopyrroles, pyrazole, isoimidazole, 1,2,3-triazole, 1,2,4-triazole, imidazole, indolizine, thiophene, 1,3-dithiole, 1,2,3-oxathiole, 1,2-dithiole, thiazole, isothiazole, 1,2,3-oxadiazole, 1,2,4-oxadiazole 1,3,4-oxadiazole, 1,2,3,4-oxatriazole, 1,2,3,5-oxatriazole, thionaphthene, isothionaphthene, isoindazole, benzoxazole, anthranil, benzothiophene, naphthothiophene, furane, isobenzofuran, benzofuran, indole, indazole, purine, carbazole, carboline, isothiazole, isoxazole, oxazole, furazan, thienofuran, pyrazinocarbazole, furopyran, pyrazolo-oxazole, selenazolo-benzothiazole, imidazothiozole, furocinnoline, pyridocarbazole, oxathioloprryole, imidazotriazine, pyridoimidazo-quinoxaline, sila-2,4-cyclopentadiene, thiapentalenes, azapentalenes, dithiatricyclounnonatetraenes, or the like.

The hetero atom analogs of the all carbon ligands of the present invention can include any ligand where at least one of the carbon atoms has been replace by a non-carbon atom. Of course, the non-carbon atom must be an atom having a valence capable of replacing the carbon atom and allowing for some degree of electron delocalization in a neutral or anionic form. For example, for a pentalene containing ring system, the hetero atom could be part of a fused ring attached to the central six electron radical such as thiapentalene, azapentalene, dithiatricyclounnonatetraene, diazatricyclounnonatetraene or thiaazatricyclounnonatetraene radicals or the hetero atom can be contained in a radical bonded to the central atom, such as heterocyclic radical substituents bonded to the central radical such as a 3-pryidylCp radical. Additionally, the cyclopentadienyl ligands with nitrogen, oxygen, phosphorus or sulfur atoms replacing the carbon atoms of the ring are contemplated. Of course, the molecular systems must be chemically stable under the reaction conditions of solution or gas phase polymerization. The synthesis of cyclopenta[b]quinolines is described in Eisch, J. J.; Gadek, F. J, *J. Org. Chem.*, 1971, 36, 2065–2071.

Of course, it should be apparent that certain of these ring systems will not support substituents at the hetero atom. Thus, oxygen and sulfur containing rings will not have substituents attached to the oxygen or sulfur atoms. Additionally, in the case of N, P, and As where these atoms are part of a double bond, they will not have substituents attached thereto.

The term five centered six π electron ligand refers to any structure containing five atoms in an configuration and capable of delocalizing 6 π electrons and that are not part of a cyclopentyl ring, preferably, the configuration should be an all cis configuration of the five centers. Of course, all five atoms should be $sp^2$ hybridized or in some other hybridization that can support electron delocalization over the five centers. One possible precursor to the Op ligands of this invention is a system were four of the atoms are part of two non-conjugated double bonds connected to and separated by a central atom, where the double bonds contribute two electrons each to the ligand system and the central atom supplies two electrons to the system either directly as the lone pair of a N or P atom or through the loss of a removable group to result in the formation of an anionic center as for a C. or Si atom. Of course, other central species could be used as well including Ge, As and the like. Additionally, the 5 centered, 6 π electron system can be part of a 6 to 20 or larger ring structure. Such ligands are better represented by formula (II):

(II)

where: G is a carbon atom, a nitrogen atom, a silicon atom or a phosphorus atom; J and J' are the same or different and where J is a $CR^3R^{3'}$ radical, a $SiR^3R^{3'}$ radical, a $NR^{3''}$ radical, a $PR^3$ radical, an oxygen atom or a sulfur atom and J' is a $CR^4R^{4'}$ radical, a $SiR^4R^{4'}$ radical, a $NR^{4''}$ radical, a $PR^{4''}$ radical, an oxygen atom or a sulfur atom; $R^2$, $R^3$, $R^{3'}$, $R^{3"}$, $R^4$, $R^{4'}$, $R^{4"}$, and $R^5$ can be the same or different and are a hydrogen atom, a linear or branched C1–C20 hydrocarbyl radical, a linear or branched C1–C20 halocarbyl radical, a linear or branched C1–C20 hydrohalocarbyl radicals, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorous hydrocarbyl radical, a nitrogen hydrocarbyl radical, a boron hydrocarbyl radical, an aluminum hydrocarbyl radical, a halogen atom, or the like or $R^2$ and $R^3$, $R^{3'}$ or $R^{3"}$ and/or $R^5$ and $R^4$, $R^{4'}$ or $R^{4"}$ can be joined together to form a 4 to 6 membered ring or a 6 to 20 fused ring system or where $R^3$, $R^{3'}$, or $R^{3"}$and $R^4$, $R^{4'}$, or $R^{4"}$ can be joined together so that the five numbered atomic centers making up the five centered delocalized six π electron ligand are contained in a 6 to 20 ring.

The numbers associated with the five atoms in formula (II) are there to indicate how substituent positions will be addressed in the remainder of the specification. Thus, for those titanocenes having a structural bridge, the structural bridge will be bonded to the central atom which is designated as position 1, in a fashion analogous to the numbering in cyclopentadiene. Additionally, the 2 and 5 positions will sometimes be jointly referred to as the α positions or proximal positions (proimal to the 1 position), while the 3 and 4 positions will sometimes be jointly referred to as the β or distal positions.

For catalyst systems that produce stereoselective and/or tactioselective polyolefins, the ligand systems that make up the catalysts/catalyst precursors of the present invention can be substituted in such as way that the systems are stereorigid (bridged), stereolocked and stereodirected. It is thought that by making bridged ligand systems and appropriately substituting the ligands of the ligand system, the catalysts/catalyst precursors of the present invention can be designed to that: (1) the substituents lock and/or direct the polymer chain-end orientation and/or monomer approach such that each successive monomer addition is stereospecific or where the degree of stereoselectivity can be controlled; and (2) the bridging group renders the ligand system rigid so that ligand rotation or isomerization is prevented or restricted. These catalyst are characterized by having β or distal substituents or their equivalent (the group on a amine or phosphine anion ligand) on the ligands or the ligand system that control the orientation of monomer addition and catalyst configurations so that tactioselective can occur. Tactioselectivity generally means that the polymers are less stereoregular than tactiospecificity means in analogy to the used of stereoselectivity and stereospecificity in synthetic chemistry. Stereoregularity relates to the manner of addition such as head-to-head, head-to-tail, etc.

Traditionally, the term metallocene denoted an organometallic coordination compound in which two cyclopentadienyl containing ligands are coordinated to or "sandwiched" about a central metal atom and where all five centers of the Cp ring are involved in metal coordination (hapta five coordinate ligands). The metal atom may be a transition metal or transition metal halide, alkylide, alkoxide, or the like. Such structures are sometimes referred to as "molecular sandwiches" since the cyclopentadienyl ligands are oriented above and below a plane containing the central coordinated metal atom nearly parallel to the planes containing the $C_p$ ring. Similarly, the term "cationic metallocene" means a metallocene in which the central coordinated metallic species carries a positive charge, i.e., the metallocene complex is a cation associated with a stable non-coordinating or pseudo-non-coordinating anion.

However, in addition to the traditional meaning of the term metallocene, the present invention expands this term to encompass ligand systems where neither of the ligands of the bridged ligand system are cyclopentadienyl containing ligands, but are instead an ligand that can be substituted analogously to cyclopentadienyl containing ligands so that the ligand system can have a given symmetry or pseudo symmetry necessary to generate tactioselective polymers.

Of course, one skilled in the art should also recognize that the permissible values for k and 1 will depend on the actual ligand system and these values are understood to conform to known organometallic structural and electronic requirements.

Suitable Z and Z' ligands for use in the present invention include, without limitation: (1) hetero atom containing ligands where the hetero atom is contained in a cyclopentadienyl containing ligand; (2) Op, HOp, CHOp, or COp containing ligands; (3) Cp containing ligands represented by the general formula $(C_5R'_{iii})$ where $(C_5R'_{iii})$ is a cyclopentadienyl or substituted cyclopentadienyl radical, each R' is the same or different group and can be any non-hydrogen group as described above for radicals $R^\alpha$ or $R^\beta$ or where two atoms are joined together to form a 4 to 20 membered ring and iii is an integer having a value from 0 to 5.

Suitable structural bridging groups R" for use in this invention and impart stereorigidity to the titanocene catalysts of this invention include, without limitation, a C1–C20 alkenyl radical, a peralkylated C1–C20 alkenyl radical, a dialkyl methyl radical, a C3-C12 cyclohydrocarbyl radical, an aryl radical, a diarylmethylene radical, a diaryl allyl radical, a silicon hydrocarbyl radical, dihydrocarbyl silenyl radicals, a germanium hydrocarbyl radical, a phosphorous hydrocarbyl radical, a nitrogen hydrocarbyl radical, a boron hydrocarbyl radical, an aluminum hydrocarbyl radical, and the like.

Other suitable bridging groups R", include ionic units such as $B(C_6F_5)_2$, and $Al(C_6F_5)_2$, and the like and $R_2C$, $R_2Si$, $R_4Et$, $R_6Pr$, and the like where R can be any hydrocarbon, cyclic hydrocarbon, cyclic or linear hydrocarbons bearing another organometallic catalyst or carboranes, etc. Indeed, the bridges can be $C_2$ bridges (and $C_3$ etc.) which form the backbone of polymeric supports (e.g. the atactic, syndiotactic and isotactic polymers from vinylindene and 9-vinyl-fluorene etc.) as well as functionalized polystyrene precursors and all other polymers with terminal or branched boron or Al functional groups which are bonded to the catalysts, e.g., in zwitterionic form. $R_2C$ and $R_2Si$ bridging groups are preferred with isopropylidene and dimethylsilenyl bridging groups being particularly preferred.

Another class of structural bridges are those involving more than a single atom on Z and Z'. Thus, R" can represent structures that bridge two atoms on each of Z and Z' and preferably two adjacent atoms on Z and Z'. These bridges can be include carbon, silicone and other types of atomic centers as in the single atom bridging groups. Generally, when Z and Z' are bridged by more than one atom, the bridge is actually form as ring turning the ZR"Z' ligand system into a fused ring system. In the case of a double bridge dimethysilyl bis cyclopentadienyl containing ligand system, the resulting ring system is a six membered ring containing two adjacent carbon atoms one each cyclopentadienyl ring and the two dimethyl silenyl moieties in a 1,4 relationship to each other.

Suitable radicals corresponding to R, R', $R^\alpha$, $R^{\alpha'}$ and $R^\beta$ and $R^{\beta'}$ include, without limitation, hydrogen atoms, linear or branched C1–C20 hydrocarbyl radicals, linear or branched C1–C20 halocarbyl radicals, linear or branched C1–C20 hydrohalocarbyl radicals, linear or branched C1–C20 alkoxy radical, C3–C12 cyclohydrocarbyl radicals, a C3–C12 cyclohydrohalocarbyl radicals, aryl radicals, alkylaryl radicals, arylalkyl radicals, silicon hydrocarbyl radicals, germanium hydrocarbyl radicals, phosphorus hydrocarbyl radicals, nitrogen hydrocarbyl radicals, boron hydrocarbyl radicals, aluminum hydrocarbyl radicals, halogen atoms, and the like. Preferable, non-hydrogen radicals include any group capable of covalently bonded to a site on the ligand system. Such groups include radicals that bond through any atom in the periodic table of elements; provided, of course, that the atom from covalent bonds with the given ligand cite. Exemplary examples include, without limitation, carbon containing radicals such as linear or branched alkyl radicals or aryl radicals, oxygen containing radicals such as alkoxy radicals, nitrogen containing radicals such as amino radicals, phosphorus containing radicals, sulfur containing radicals, silicone containing radicals trialkylsilyl radicals, and radicals bonding through B, Ge, Ga, Al, F, Cl, Br, I, Mg, Ca, or any other atomic center including metallic centers such as transition metals.

Additionally, suitable radicals corresponding to R, R', $R^\alpha$, $R^{\alpha'}$ and $R^\beta$ and $R^{\beta'}$ include, without limitation, zwitterionic radicals such as $Cp-B(C_6F_5)_{3-}$, $Cp-Al(C_6F_5)_3^-$, $Cp-Al(CF_3)_3^-$, $Cp-X-Al(C_6F_5)_3^-$, $Cp-X-B(C_6F_5)_3^-$, and the like are also suitable radicals, where X can represent an alkenyl group, alkenoxy group or the like.

Titanocenes of this invention containing zwitterionic groups on either one of the ligand making up the ligand system of the present invention and incorporating a group 4 metal for Me would not need an independent and sometimes stereochemically interfering counterion (i.e., 1=0). In this case, one could obtain heterogeneous insoluble ion-pair systems for improved polymer particle size and morphology control.

Suitable hydrocarbyl radical or halogen corresponding to Q include, without limitation, a linear or branched C1–C20 alkyl radical, as aryl radical, an alkylaryl radical, an arylalkyl radical, a F atom, a Cl atom, a Br atom, and an I atom. Q is preferably a methyl or halogen, and more particularly a chlorine atom.

Exemplary hydrocarbyl radicals are methyl, ethyl, propyl, butyl, arnyl, isoamyl, hexyl, isobutyl, heptyl, octyl, nonyl, decyl, cetyl, 2-ethylhexyl, phenyl, and the like. Exemplary alkylene radicals are methylene, ethylene, propylene, isopropylidenyl, and the like. Exemplary halogen atoms include fluorine chlorine, bromine and iodine and of these halogen atoms, chlorine is preferred. Exemplary of the alkylidene radicals is methylidene, ethylidene and propylidene. Exemplary nitrogen containing radicals include amines such as alkyl amines, aryl amines, arylalkyl amines, and alkylaryl amines.

Suitable non-coordinating counterions corresponding to A in the general formula include, without limitation, $[BF_4]^-$, $B(PhF_5)^-_4$, $[W(PhF_5)_6]^-$, $[Mo(PhF_5)_6]^-$ (wherein $PhF_5$ is pentafluorophenyl ), $[ClO_4]^{31}$, $[S_nO_6]^-$, $[PF_6]^-$, $[SbR_6]^-$ or $[AlR_4]^-$ (wherein each R is independently, Cl, a C1–C5 alkyl group preferably a methyl group, an aryl group, e.g. a phenyl or substituted phenyl group, or a fluorinated aryl and alkyl group). By non-coordinating the inventor means that the counterion will not so strongly associated with the titanocene to interfere with monomer coordination and insertion or will not tend to reduce the titanium ion from its active state.

Tactioselective titanocene (i.e., titanocenes that produce tactioselective polymers) of the present invention are generally characterized by having symmetry or pseudo symmetry associated with the ligand system or the titanocene. As stated previously, ligand systems including two bridged ligands and having $C_2$ or pseudo-$C_2$ symmetry or having one bilaterally symmetric ligand and one asymmetric ligand and at least one bulky β-substituent or pseudo β-substituent (in the case of titanocenes having non-Cp groups) produce polymers with varying degrees of isotacticity; while, ligand systems including two ligands and having $C_S$ or pseudo-$C_S$ symmetry produce polymers with varying degrees of syndiotacticity.

Indeed, the present catalysts can be tailored using a number of strategies to control properties such as the relative stereoselectivity and or stereospecificities of the polymer products produces, the molecular weight of the polymer products produced, and other significant polymer properties. The single carbon bridged metallocenes have been found to be more selective than the silicon bridged analogs for producing polymers with varying degrees of syndiotacticity; while the carbon bridged metallocenes are generally less selective than the silicon bridged analogs for generating polymers with varying degrees of isotacticity. Typically, it is also though that the larger the steric requirements are for the β-substituents, the more stereospecific the catalyst is. The difference in the steric requirements for the β-substituent, which are thought to control the regularity of monomer addition, can be used to vary and indeed optimize the degree of stereoregularity in the final polymer product. It has also been found that substituents at the α-positions tend to increase the molecular weight of the resulting polymer.

The present invention is directed to both neutral titanocene and cationic titanocene catalysts and catalyst precursors as evidenced by the subscript 1 associated with the counterion A (which is of course an anion) having permissible values of 0 to 2, i.e., when 1=0, the catalysts are neutral and when 1=1 or 2 the catalysts are cationic as evidenced by the inclusion of an anion is the general formula.

The catalysts of the present invention can also be designed to produce polymers with very high tacticity indices. In order to produce tactically specific polymers from the catalysts and/or catalyst precursors of the present invention, the characteristics of the β-substituents on the bridged ligands are important. Thus, the "steric requirement" or "steric size" of the β-substituents can be designed to control the steric characteristics of the catalysts/catalyst precursors such that the arrangement of the β-substituents allows control of the stereochemistry of each successive monomer addition.

It may also be possible to strategically arrange substituents with the proper steric properties on an appropriate ligand sites of the ligand system which serve as chain end conformational locks (preferably positioned in the mouth of the ligand) and which could also confer solubility (ion pair separation for better catalyst activity and stereospecificity) and/or insolubility (for better control of polymer morphology), as desired. The bridged, substituted catalysts/ catalyst precursors are stereorigid, provide chain-end conformational locks, and are superior to those without such conformational locks.

Prior art has shown, for example, that a methyl substituent positioned at the α-Cp position on the C5 ring of bisindenyl catalysts increases the molecular weight of isotactic polypropylene produced with the $Et[Ind]_2ZrCl_2$ based catalyst. Similarly, a methyl substituent on the C6 ring of the indenyl ring system has reduced the stereospecificity; depending on the positional isomerism. These effects can be reasonably expected to carry over to the catalyst system of the present invention.

Also, the addition of methyl, t-Bu, OMe, Ph, etc. substituents to the ligand system and to the bridging group R" can have steric, solubility, and/or electronic influences on catalysts in syndiotactic and isotactic specific polymerizations. These effects are likewise expected to be carried over to titanocenes of the present invention and to their mixtures with other catalysts. Similarly the effects of substituting Al for B in the anions and the differences between carboranes and methylalumoxanes and other counter anions are reasonably expected to be carried over to the catalyst systems described herein.

By making the sterically larger β-substituents different and/or the sterically smaller β-substituents different, the tactioselective versions of the catalysts/catalyst precursors of the present invention can be designed to impart any degree of tacticity to the resulting polymers. Thus, if one β-substituent is t-butyl and another is ethyl, and the other two are methyls, the tactiospecificity of the catalyst system will be reduced relative to the one having two t-butyls and two methyls. Thus, titanocenes having pure symmetry will generally yield polymers with high indices of tacticity (high degree of tactiospecificity) than titanocenes with pseudo or near symmetry.

The concept of substituents with different steric requirements, size or bulk is well known in the art. However, to ensure that ordinary artisans understand its usage in the context of this invention, a non-exhaustive and illustrative list of the relative steric bulk of a variety of substituents can be found in Stoughtan and Adams article in J. Am. Chem. Soc., 54, 4426 (1932) and Yuan and Adams article in J. Am. Chem. Soc. 54, 4434 (1932). Additionally, for purposes of this invention, a fluorine atom will be considered sterically larger than a hydrogen atom, even though many there is data to indicate that the two atoms have a similar steric bulk.

Of course, cationic titanocene catalysts/catalyst precursors require the counterion A to maintain their net neutrality. The counterion A in formula (I) is preferentially a compatible non-coordinating or weakly coordinating anion that either does not coordinate with the titanocene cation or only weakly coordinates to the cationic titanocene, yet remains sufficiently labile so that it can be readily displaced by a neutral Lewis base such as a monomer unit. Compatible non-coordinating or weakly coordinating anions are described as anions that stabilize the cationic titanocene catalyst systems, but do not transfer an electron or electron equivalent to the cation to produce a neutral titanocene and a neutral byproduct of the non-coordinating or weakly coordinating anion.

The useful size of the counterion A will also depend on the bulkiness or steric requirements of the ligand system including the substituents on the ligands of the ligand system. In addition to size, it is also thought that other characteristics are important for suitable non-coordinating or weakly coordinating counterions. Such characteristics include stability and bonding. The counterion must be sufficiently stable so that it cannot be rendered neutral by virtue of the titanocene cation electron extraction and the bond strength with the cation must be sufficiently week as to not interfere with monomer coordination and chain propagation.

A preferred procedure for producing cationic titanocene catalyst of the present invention (1=1 or 2) involves the reaction of an ion-pair in a non-coordinating solvent with a titanocene of the general formula where 1=0. For example, triphenylcarbenium tetrakis(pentafluorophenyl) boronate or a similar ion-pair may be reacted with a neutral titanocene of the present invention in a solvent such as toluene to generate a cationic titanocene analog thereof This preparation method was referenced in U.S. Pat. No. 5,225,550, which is incorporated by reference.

A preferred application of the present invention is in the polymerization of alpha olefins, specifically propylene or propylene-ethylene copolymers, into all manners of polymers including atactic, isotactic, syndiotactic, hemi-isotactic polypropylenes or mixtures thereof However, the invention may be employed in the preparation of hemi-isotactic, isotactic or syndiotactic polymers derived from other non-symmetric ethylenically unsaturated monomers. For example, syndiospecific, isospecific or hemi-isotactic specific polymers of 1-butene, 1-pentene, 1-hexene, styrene or the like can be prepared using the catalysts of present invention.

Addition polymerizable monomers suitable for use in this invention include, without limitation, addition polymerizable, ethylenically unsaturated monomers or any organic molecule having a terminal vinyl group ($CH_2=CH$) such as, without limitation: α-olefins including propylene, 1-butene, 1-pentene, 1-hexene, 4-methyl-1-pentene and the like; vinyl halides including vinyl fluoride, vinyl chloride, and the like; vinyl arenes including styrene, alkylated styrenes, halogenated styrenes, haloalkylated styrenes and the like; dienes such as 1,3-butadiene and isoprene (i.e., 1,2-addition). Ethylene and polypropylene are probably of the greatest practical significance and the invention will be described in detail with reference to the production of polypropylenes and/or polypropylene copolymers, but it should be understood that this invention is generally applicable to all addition polymerizable monomers. The polymerization procedures disclosed in U.S. Pat. No. 4,892,851, may be also employed in carrying out the methods of the present invention and is incorporated herein by reference.

The catalysts and catalyst precursors of the present invention can be use in conjunction with various co-catalysts. Although many of the species are active alone, many of the species of the general formula become activated (or become commercially active) upon the addition of various co-catalysts. Co-catalysts, usually organo-aluminum compounds such as trialkylaluminum, trialkyloxyaluminum, dialkylaluminum halides or alkylaluminum dihalides may be employed in the present invention. Especially suitable alkylaluminums are trimethylaluminum and triethylaluminum with the latter, commonly referred to as TEAL, being most preferred. Methylaluminoxane (MAO) are also usable in carrying out the methods of the present invention especially for neutral titanocene catalyst precursors. MAO may be used as a co-catalyst with titanocene catalysts in amounts well in excess of the stoichiometric equivalent.

The alumoxanes are polymeric aluminum compounds which can be represented by the general formulae (R—Al—O)$_n$ which is a cyclic compound and

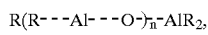

which is a linear compound and where R is a $C_1$–$C_5$ alkyl group such as, for example, methyl, ethyl, propyl, butyl and pentyl and n is an integer from 1 to about 20. Most preferably, R is methyl and n is about 4.

Generally, in the preparation of alumoxanes from, for example, aluminum trimethyl and water, a mixture of the linear and cyclic compounds is obtained. The alumoxane can be prepared in various ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate. Preferably, the alumoxane is prepared in the presence of a hydrated copper sulfate. The method comprises treating a dilute solution of aluminum trimethyl in, for example, toluene, with copper sulfate represented by the general formula $CuSO_4 5H_2O$. The ratio of copper sulfate to aluminum trimethyl is desirably about 1 mole of copper sulfate for 4 to 5 moles of aluminum trimethyl. The reaction is evidenced by the evolution of methane.

The ratio of aluminum in the alumoxane to total metal in the titanocenes can be in the range of about 0.5:1 to about 10,000:1, and preferably about 5:1 to about 1000:1. The solvents used in the preparation of the catalyst system are inert hydrocarbons, in particular a hydrocarbon that is inert with respect to the catalyst system.

Such solvents are well known and include, for example, isobutane, butane, pentane, hexane, heptane, octane, cyclohexane, methylcyclohexane, toluene, xylene and the like. As a further control and refinement of polymer molecular weight, one can vary the concentration alumoxane. Higher concentrations of alumoxane in the catalyst system results in higher polymer product molecular weight.

Since, in accordance with this invention, one can produce high viscosity polymer products at relatively high temperature, temperature does not constitute a limiting parameter; provided, however, that the pressure and temperature is such that the polymerization media is in a condensed phase. The titanocenes described herein, therefore, are suitable for the condensed phase polymerization of olefins in solution, slurry or bulk and over a wide range of temperatures and pressures. Again the temperature and pressure are designed to maintain the polymerization reaction in a condensed phase such as a liquid phase, a liquid phase at its critical point or a liquid under super critical conditions. For example, such temperatures may be in the range of about 50° C. to about 280° C. and especially in the range of about 80° C. to about 160° C. The pressures employed in the process of the present invention are those well known for, for example, in the range of about 1 to about 500 atmospheres and greater and at the same time sufficient to maintain the polymerization in a condensed phase.

In a solution phase polymerization the alumoxane is preferably dissolved in a suitable solvent, typically in inert hydrocarbon solvent such as toluene, xylene, and the like in molar ratios of about $5 \times 10^{-3}$M. However greater or lesser amounts can be used. The soluble titanocenes can be converted to supported heterogeneous catalyst by depositing said titanocenes on typical catalyst supports such as, for example, silica, alumina, and polyethylene. The solid catalysts in combination with an alumoxane can be usefully employed in slurry and gas phase olefin polymerizations.

After polymerization and deactivation of the catalyst, the product polymer can be recovered by processes well known in the art for removal of deactivated catalysts and solution. The solvents may be flashed off from the polymer solution and the polymer obtained extruded into water and cut into pellets or other suitable comminuted shapes. Pigments, antioxidants and other additives, as is known in the art, may be added to the polymer.

The polymer product obtained in accordance with this invention will generally have a weight average molecular weight in the range of about 1,400,000 to about 500 and preferably 500,000 to about 1000. The polydispersities (molecular weight distribution) expressed as Mw/Mn are typically from 1.5 to 4, but can be higher. The polymers contain 1.0 chain end unsaturation per molecule. Broadened MW can be obtained by employing two or more of the titanocenes of this invention in combination with the alumoxane. The polymers produced by the process of this present invention are capable of being fabricated into a wide variety of articles, as is known for polymer products derived from addition polymerizable monomers.

While the applicant's invention is not to be restricted by theory, it is believed that neutral titanocenes form cationic complexes by reaction with the MAO in the manner as disclosed by Zambelli, A. et al., "Isotactic Polymerization of Propene: Homogenous Catalysts Based on Group 4 Titanocenes Without Methylaluminoxane", Macromolecules 1989, 22, pages 2186–2189.

The catalyst precursors used in the present invention may be prepared by procedures similar to those disclosed in U.S. Pat. No. 4,892,851 (incorporated herein by reference), while the active cationic catalysts may be produced by simply converting the neutral titanocene into the cationic state following procedures such as those disclosed in European applications 277,003 and 277,004 or by reaction with triphenylcarbenium boronates. Similarly, alcohol —B(PhF5)$_3$ complexes can be used as anionic precursors for forming the active cationic titanocenes of the present invention where the alcoholic proton reacts with an amine of an alkyl group on the coordinating metal atoms to generate a cationic titanocene and an alkoxide —B(PhF5)3 anion. For additional information see, A. R. Siedle, W. M. Lammana, R. A. Newmark, J. St. Werrs, D. E. Richardson, M. Ryan, Makromal Chern, Masroonal Symp. 66, 215 (1993).

The catalysts of this invention can also be converted to supported heterogeneous catalysts by depositing the catalysts on supports including, without limitation, silica, alumina, magnesium dichloride, polystyrene beads, and like. The supported analogs of the present catalyst can improve the bulk density of the polymer as further described in Canadian Pat. No. 2,027,145, U. S. Pat. Nos. 4,935,474 and 4,530,914 (incorporated herein by reference) and European Appln. Nos. 0,427,697 and 0,426,638, incorporated herein by reference.

The catalyst can also be chemically linked to the support by placing functional groups with ion pairs or Lewis acid centers or Lewis base centers on the ligands and/or supports. Supporting can also be achieved by using large (oligomeric or polymeric) insoluble anions as counter ions.

The catalysts of the present invention can be used to prepare low, moderate and high molecular weight polymers, low, moderate and high density polymers, elastomers, aspecific, isospecific, syndiospecific, hemi-isospecific, and/or aspecific polymers, not only of propylene, but for all α-olefins such as 1-butene, 1-pentene, 1-hexene, 4-methyl-1-pentene, $CH_2=CH(CH_2)_p Si(CH_3)_3$ where p is 1 to 4, and the like. Additionally, the catalysts of this invention can polymerize singly or in mixtures all addition polymerizable monomer including vinyl monomers and diene monomers.

One of ordinary skill should recognize that the ligands that can give rise to isoselective catalysts will give rise to a meso form which is asymmetric and a rac form that is selective to specific to isotactic polymers. The stereospecific rac catalysts can be separated from the meso form by crystallization. Perhaps we should also mention that it is well known from the Bercaw et al. work (Reference: J. Ann Cherry Soc. 1992, 114, 7607 J. E. Bercaw and E. B. Coughlin.) in the prior art that rac-fitanocenes free of the undesirable aspecific meso stereoisomers can be prepared by placing suitable bulky substituents such as $Si(Me)_3$ on the ligand atoms proximal to (α to) the bridgehead atom.

The catalysts of the present invention can obviously be used in conjunction with each other, all other titanocene catalysts, TiCl$_3$/DEAC, and or TiCl$_4$/MgCl$_2$/TEAL catalysts having internal electron donors such as diisobutylypthalate and external donors such as diphenyldimethoxysllane, methanol, etc. to produce polymers with mixed stereochemical compositions, distributions or tailored molecular weight distributions. Reactor blends of polymers with optimized physical, thermal, mechanical, and Theological properties can be tailored to produce the optimum mixture for specific applications requiring high melt strength, high clarity, high impact strength, and high rates of crystallization, simply by mixing catalyst species together in appropriate ratios.

The catalysts of the present invention clearly have the potential to influence the rate of termination by β-hydride elimination reactions. This, therefore, provides a novel ligand effect for controlling polymer molecular weights. These catalysts can be exploited to tailor molecular weights and hence molecular weight distributions with mixed species of the catalysts and any other class of catalysts. This would be advantageous in tailoring the polymer properties in HDPE, LLDPE, i-PP, s-PP, etc. Similarly the chain-end conformation locking substituent will influence the rate of reactivity of the new titanocenes with α-olefins such as propylene, butene and hexene. The new ligand effects on the catalyst reactivity ratios can be exploited to produce reactor blends with varying compositions, sequences, distributions and/or molecular weight distributions. Similarly, the catalysts can reasonably be expected to provide improved tailored grades of polypropylene and propylene-ethylene high impact copolymers as reactor blends or from reactors in series including fluidized and stirred gas phase polymerizations.

The catalysts of the present invention can also be used to generate copolymers of olefins and copolymers of olefins and dienes with varying degrees of tactiospecificity.

The generalized methods that follow describe the preparation of the catalyst and/or catalyst precursors and active catalysts. It is important that the catalyst complex be "pure" as low molecular weight, amorphous polymer can be produced by impure catalysts.

Generally, the preparation of the titanocene complex consists of forming and isolating the ligand system which is then aromatized or deprotonated to form delocalized electron systems or hetero anions and are then reacted with a metal halide, alkylide, or the like to form the complex.

The synthesis procedures are generally performed under an inert gas atmosphere using a glove box or Schlenk techniques. The synthesis process generally comprises the steps of 1) preparing the halogenated or alkylated metal compound, 2) preparing the ligand, 3) synthesizing the complex, and 4) purifying the complex.

The synthesis of the β-substituted Cp ligands of the present invention can be accomplished by contacting an appropriately substituted fulvene with an appropriately substituted cyclopentadienyl containing anion ring under reaction conditions sufficient to produce a bridged structure having the requisite β-substituents on the Cp rings to yield ligands with either C$_2$ or C$_S$ or pseudo C$_2$ or pseudo C$_S$ symmetry.

Fulvene is cyclopentadiene with an exo-cyclic methylene group at the 1 position of cyclopentadiene ring. The exo-cyclic methylene carbon is the 6 position of fulvene. Since this carbon can ultimately become the bridging group R" in formula (I), the preferred fulvenes for the preparation of the present catalysts are typically 6,6-disubstituted fulvenes so that the resulting bridging group is a tertiary carbon atom.

The fulvenes useful in preparing the ligands of the present invention have substituents in the 3 and 4 positions Q and are generally 6,6 disubstituted, while the other sites can be substituted or unsubstituted as shown below:

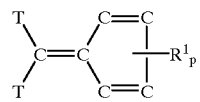

where R' become substituents on the resulting Cp ring, p is a integer having a value from 0 to the maximum number of substituents on the fulvene m and where the T, T' and the exocyclic carbon (C6 in fulvene) are the precursor to the structural bridging group R".

The preparation of bridged ligand systems where the bridge is between two atoms on each ligand Z and Z' are generally described in "Ziegler Catalyst," ed. G. Fink, R. Mulhaupt, H. H. Brintzinger, *Recent Scientific Innovations and Technological Improvement*, Pub. Springer Verlag (1995) pp. 318–320, incorporated herein by reference. Preferred bridged ligand systems where the bridge is bonded to two adjacent atoms of the ligands Z and Z' according to formula (d).

As noted previously, a preferred mode of converting the neutral titanocenes to cationic titanocene catalyst useful in the present invention involves reaction of the neutral titanocenes with a triphenylcarbenium boronate. A preferred reactant is triphenylcarbenium tetrakis (pentafluorophenyl) boronate.

The catalysts of the present invention can also be made into efficient pre-polymerized catalysts by the methods disclosed in U.S. Pat. Nos. 3,893,989, 4,200,171, 4,287,328, 4,316,966 and 5,122,583 incorporated herein by reference. Essentially, the catalysts are used to polymerize monomer on a small scale. The pre-polymerized catalysts can be prepared in the presence of co-catalysts such as the ones described previously and optionally in the presence of various electron donors.

The pre-polymerized catalysts can then be introduced into a reaction zone containing monomer. The resulting polymerization can show greatly improved catalytic efficiencies. The preferred methods for using pre-polymerized catalysts of the present invention are: (1) contacting a pre-polymerized catalyst of formula (I) with a co-catalyst and introducing the catalyst into a polymerization reaction zone containing monomer and (2) contacting a pre-polymerized catalyst of formula (I) with a co-catalyst and introducing the catalyst into a polymerization reaction zone containing monomer. Of course, the pre-polymerized catalysts of formula (I) can be introduced into the reaction zone in a stream either separately or in conjunction with separate streams containing the co-catalyst and/or electron donors.

Preferred pre-polymerized catalysts of the present invention have a weight ratio of polymer/catalyst of approximately 0.1–100 with ratios of less than 10 being particularly preferred. The syntheses are conveniently done at room temperature or lower in low boiling solvents which are readily evaporated in vacuo.

The preferred process of the present invention is in relative high temperature condensed phase polymerization in reactors such as stirred tank reactors or plug-flow reactors or other reactor systems that are intended to be used under condensed phase conditions for the polymerization of olefins. Generally, the polymerizations will be carried out in solution where the monomer(s) and resulting polymers are part of an organic solution. Suitable solvents for solution polymerizations include any standard hydrocarbon solvent well known in the polymerization art including, without limitation, relatively high boiling alkanes such as isopar, relatively high boiling aromatics such as toluene, xylene, or similar aromatic solvents or any other solvent that supports olefin polymerization. Alternative, the monomers themselves can serve as the solvent in what has become known in the art as bulk polymerization. Again, it must be stressed that the reactions is an temperatures and pressures where the polymerizing media is in a non-gaseous or condensed phase. Such phases include traditional liquid phases, but also include critical and supercritical phase conditions.

EXAMPLES

A number of polymerization runs where made using Ti, Zr, and Hf catalyst prepared from the system [1(2-methyl-4-phenylindenyl)], abbreviated DMSMPI below, or the Et[Ind]$_2$ ligand system. The Zr and Hf catalyst were prepared by reacting the ligand system dianion with $ZrCl_4$ or $HFCl_4$, where the dianion is prepared by reacting the neutral ligand with two molar equivalents of an alkyllithium reagent such as nbutyllithium or methyllithium. Titanocenes on the other and are preferably prepared by reacting the dianion with $TiCl_3$ and then bubbling gaseous HCl through the reaction media to affect an oxidation of the Ti(III) system to a Ti(IV) system. The Following data was obtained from a series polymerization runs:

TABLE 1

| Run and Polymerization Data | | | | | | | |
|---|---|---|---|---|---|---|---|
| Run | Catalyst[a] ($1 \times 10^{31\ 5}$ mol) | Propene[b] (atm) | T (° C.) | t (min) | Yield (g) | Activity[c] | m.p. (° C.) |
| 1 | DMSMPI $ZrCl_2$ | 0.875 | 50 | 20 | 4.63 | 1596552 | 142.09 |
| 2 | DMSMPI $TiCl_2$ | 0.875 | 50 | 20 | 1.16 | 400000 | 146.23 |
| 3 | DMSMPI $HfCl_2$ | 0.875 | 50 | 20 | traces | — | 140.12 |
| | Catalyst[d] ($1 \times 10^{-6}$ mol) | Propene (g) | T (° C.) | t (min) | Yield (g) | Activity[e] | m.p. |
| 4 | DMSMPI $ZrCl_2$ | 29.5 | 50 | 30 | 1.10 | 314286 | 160.88 |
| 5 | DMSMPI $TiCl_2$ | 33.9 | 50 | 60 | 0.650 | 160494 | 165.02 |
| 6 | DMSMPI $HfCl_2$ | 35.6 | 50 | 60 | 0.410 | 48235 | 162.44 |
| 7 | DMSMPI $ZrCl_2$ | 45.1 | 15 | 60 | 1.70 | 154545 | 158.40 |
| 8 | DMSMPI $TiCl_2$ | 51.9 | 15 | 60 | 0.290 | 24166 | 164.39 |
| 9 | Et[Ind]$_2$ZrCl$_2$ | 41.0 | 15 | 60 | 7.30 | 744898 | 143.67 |
| 10 | DMSMPI $HfCl_2$ | 24.3 | 80 | 30 | 5.450 | 1879310 | 156.03 |
| | Catalyst ($1 \times 10^{-6}$ mol) | Propene/H$_2$ (g)/(mL) | T (° C.) | t (min) | Yield (g) | Activity[g] | m.p. |
| 11[h] | DMSMPI $ZrCl_2$ | 23.5/17 | 50 | 10 | 1.850 | 19892473 | 159.22 |
| 12 | DMSMPI $TiCl_2$ | 23.6/17 | 50 | 10 | 0.300 | 150000 | 158.08 |
| 13 | DMSMPI $HfCl_2$ | 26.6/17 | 50 | 10 | 0.150 | 35714 | 160.88 |

[a]Polymerizations run in 30 mL of toluene with an Al:Metal molar ratio of 1000.
[b]Partial Pressure of propene
[c]gPP/(mol catalyst) (h) (Partial Pressure of Propene)
[d]Polymerizations run 100 mL toluene with an Al:Metal molar ratio of 5000
[e]gPP/(mol catalyst) (h) (mol/l monomer)
[f]Polymerizations run in 100 mL of toluene
[g]gPP/(mol catalyst) (h) (mol/l monomer)
[h]mol catalyst: $1 \times 10^{-7}$; Al/Metal molar ratio 50000

While in accordance with the patent statutes, the best mode and preferred embodiments of the invention have been described, it is to be understood that the invention is not limited thereto, but is to be measured by the scope and spirit of the appended claims.

I claim:

1. A process comprising the step of contacting, in a condensed phase, propylene with at least one titanocene catalyst/catalyst precursor of formula (I):

$$ZR''Z'TiQ_kA_l \qquad (I)$$

where:

(a) Z and Z' are the same or different and are a cyclopentadienyl containing ligand or a heterocyclic analog of a cyclopentadienyl containing ligand;
(b) R'' is a structural bridge;
(c) Q is a linear or branched alkyl radical, an aryl radical, an alkenyl radical, an alkylaryl radical, an arylalkyl radical or a halogen atom;
(d) A is a counterion;
(e) k is an integer having a value from 1 to 3;
(f) 1 is an integer having a value from 0 to 2;
(g) Z and Z' have at least one β substituent sterically larger than a hydrogen atom;
(h) the ZR''Z' ligand system has $C_2$ or near $C_2$ symmetry;
(i) the process generates isotactic polypropylene having a melting point above about 158° C. at a temperature greater than or equal to about 50° C. and at a pressure sufficient to maintain the contacting in the condensed phase.

2. The process of claim 1, wherein the condensed phase is a solution and the solvent is an alkane of aromatic solvent and Z and Z' are the same or different ligand of formulas (a–c):

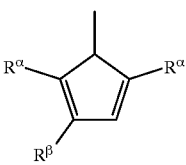
(a)

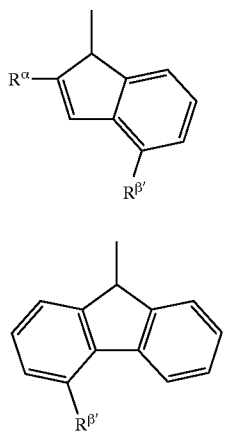

(b)

(c)

where each $R^\alpha$ is the same or different and is a hydrogen atom of non-hydrogen group and $R^\beta$ and $R^{\beta'}$ are the same or different and are a non-hydrogen group.

3. The process of claim 2, wherein l=1 and k=1.

4. The process of claim 2, further comprising contacting, in the condensed phase, the at least one addition polymerizable monomer with a catalyst system comprising at least one organo-aluminum co-catalyst and the at least one titanocene catalyst/catalyst precursor and wherein l=0 and k=2 and the catalyst system has an aluminum to titanium ratio between about 1 and about 10,000.

5. The process of claim 4, wherein the ZR"Z' ligand system has $C_2$ symmetry, the $R^\beta$ and $R^{\beta'}$ are sterically equal to or larger than a methyl group, and the catalyst system generates isotactic polypropylene having a melting point above about 162° C.

6. The process of claim 5, wherein R" is a dialkylsilenyl radical, Z and Z' are the same radical of formula (b) where $R^\alpha$ is sterically equal to or greater than a methyl group and $R^{\beta'}$ is an aryl radical, the ratio is about 5,000, the temperature is about 50° C. and the catalyst system generates an isotactic polypropylene having a melting point about 165° C.

7. The process of claim 5, wherein R" is a dialkylsilenyl radical, Z and Z' are the same radical of formula (c) where $R^\alpha$ is sterically equal to or greater than a methyl group and $R^{\beta'}$ is an aryl radical, the ratio is about 5,000, the temperature is about 50° C. and the catalyst system generates an isotactic polypropylene having a melting point about 162° C.

8. A process comprising the step of contacting, in a condensed phase, at least one addition polymerizable monomer with a catalyst system comprising at least one organo-aluminum co-catalyst and at least one titanocene catalyst/catalyst precursor of formula (I):

$$ZR"Z'TiQ_k \qquad (I)$$

where:

(a) Z and Z' are the same of different ligand of formulas (a–c):

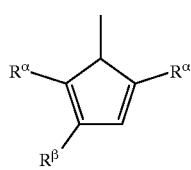

(a)

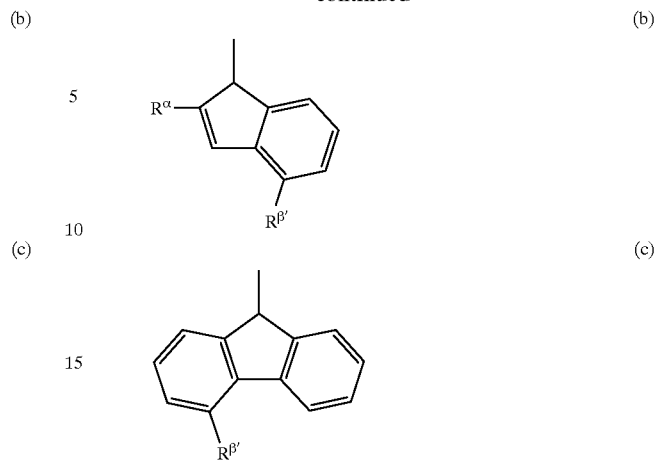

where each $R^\alpha$ is the same or different and is a hydrogen atom or non-hydrogen group and $R^\beta$ and $R^{\beta'}$ are the same or different and are a non-hydrogen group;

(b) R" is structural bridge;

(c) Q is a linear or branched alkyl radical, an aryl radical, an alkenyl radical, an alkylaryl radical, an arylalkyl radical or a halogen atom;

(d) k is an integer having a value of 2;

(e) the ZR"Z' ligand system has $C_2$ or near $C_2$ symmetry; and (f) the process generates isotactic polymers having an isotactic selectivity between about 90% and about 100% for non-ethylene type monomers at a temperature greater than or equal to about 50° C. and at a pressure sufficient to maintain the contacting in the condensed phase;

(g) the addition polymerizable monomer is selected from the group consisting of α-olefins; vinyl halides; vinyl arenes; dienes; acrylonitrile and vinyl pyridine; and (h) the non-hydrogen group is selected from the group consisting of linear or branched C1–C20 hydrocarbyl radicals, linear or branched C1–C20 halocarbyl radicals, linear or branched C1–C20 hydrohalocarbyl radicals, linear or branched C1–C20 alkoxy radical, C3–C12 cyclohydrocarbyl radicals, a C3–C12 cyclohydrohalocarbyl radicals, aryl radicals, alkylaryl radicals, arylalkyl radicals, silicon hydrocarbyl radicals, germanium hydrocarbyl radicals, phosphorus hydrocarbyl radicals, nitrogen hydrocarbyl radicals, boron hydrocarbyl radicals, aluminum hydrocarbyl radicals, halogen atoms, sulfur containing radicals, radicals bonding through Ga, Mg, Ca, and zwitterionic radicals.

9. The process of claim 8, wherein the condensed phase is a solution and the solvent is an alkane or aromatic solvent and the catalyst system has an aluminum to titanium ratio between about 1 to about 10,000.

10. The process of claim 9, wherein the ratio is about 5,000, the ZR"Z' ligand system has $C_2$ symmetry, the β substituents are the same of different aryl radicals, the monomer is propylene and the catalyst system generates isotactic polypropylene having a melt point above about 162° C.

11. The process of claim 10, wherein R" is a dialkylsilenyl radical, Z and Z' are the same radical of formula (b) where $R^\alpha$ is sterically equal to or greater than a methyl group and $R^{\alpha'}$ is an aryl radical, the ratio is about 5,000, the temperature is about 50° C. and the catalyst system generates an isotactic polypropylene having a melting point about 165° C.

12. The process of claim 10, wherein R" is a dialkylsilenyl radical, Z and Z' are the same radical of formula (c) where $R^{\alpha}$ is sterically equal to or greater than a methyl group and $R^{\beta'}$ is an aryl radical, the ratio is about 5,000, the temperature is about 50° C. and the catalyst system generates an isotactic polypropylene having a melting point about 162° C.

13. A process comprising the step of contacting, in a condensed phase, propylene with a catalyst system comprising at least one organo-aluminum co-catalyst and at least one titanocene catalyst/catalyst precursor of formula (I):

  (I)

where:
(a) Z and Z' are the same ligand of formulas (a–c):

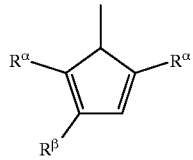 (a)

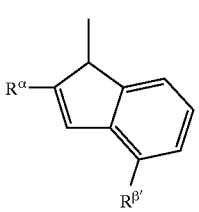 (b)

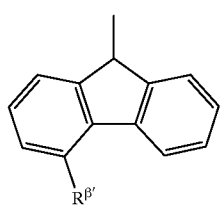 (c)

where each $R^{\alpha}$ is the same or different and is a hydrogen atom or non-hydrogen group and the $R^{\beta}$ or the $R^{\beta'}$ are the same and are sterically equal to or large than a methyl group;
(b) R" is structural bridge;
(c) Q is a linear or branched alkyl radical, an aryl radical, an alkenyl radical, an alkylaryl radical, an arylalkyl radical or a halogen atom;
(d) k is an integer having a value of 2;
(e) the ZR"Z' ligand system has $C_2$ symmetry; and
(f) the process generates isotactic polypropylene having a melting point temperature above about 162° C. at a temperature greater than or equal to about 50° C. and at a pressure sufficient to maintain the contacting in the condensed phase; and
(g) the non-hydrogen group is selected from the group consisting of linear or branched C1–C20 hydrocarbyl radicals, linear or branched C1–C20 halocarbyl radicals, linear or branched C1–C20 hydrohalocarbyl radicals, linear or branched C1–C20 alkoxy radical, C3–C12 cyclohydrocarbyl radicals, a C3–C12 cyclohydrohalocarbyl radicals, aryl radicals, alkylaryl radicals, arylalkyl radicals, silicon hydrocarbyl radicals, germanium hydrocarbyl radicals, phosphorus hydrocarbyl radicals, nitrogen hydrocarbyl radicals, boron hydrocarbyl radicals, aluminum hydrocarbyl radicals, halogen atoms, sulfur containing radicals, radicals bonding through Ga, Mg, Ca, and zwitterionic radicals.

14. The process of claim 13, wherein the condensed phase is a solution and the solvent is an alkane or an aromatic solvent and the catalyst system has an aluminum to titanium ratio between about 1 to about 10,000.

15. The process of claim 14, wherein Z and Z' are the same ligand of formula (b):

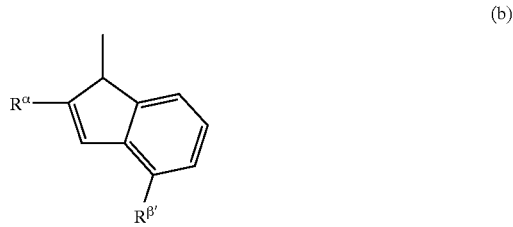 (b)

where each $R^{\beta'}$ radicals are the same or sterically similar radicals selected from the group consisting of radicals sterically large than a methyl group, the ratio is between about 1 and about 5,000 and the catalyst system generates isotactic polypropylene having a melting point above about 162° C.

16. The process of claim 15, wherein $R^{\beta'}$ radicals are the same or sterically similar radicals selected from the group consisting of aryl radicals, alkylaryl radicals, arylalkyl radicals and silicon hydrocarbyl radicals.

17. The process of claim 16, wherein $R^{\beta'}$ radicals are the same or sterically similar aryl radicals.

18. The process of claim 14, wherein Z and Z' are the same ligand of formula (c):

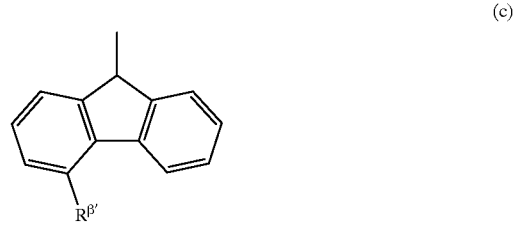 (c)

where each $R^{\beta'}$ radicals are the same or sterically similar radicals selected from the group consisting of radicals sterically large than a methyl group, the ratio is between about 1 and about 5,000 and the catalyst system generates isotactic polypropylene having a melting point above about 162° C.

19. The process of claim 18, wherein $R^{\beta'}$ radicals are the same or sterically similar radicals selected from the group consisting of aryl radicals, alkylaryl radicals, arylalkyl radicals and silicon hydrocarbyl radicals.

20. The process of claim 19, wherein $R^{\beta'}$ radicals are the same or sterically similar aryl radicals.

* * * * *